United States Patent Office 3,344,131
Patented Sept. 26, 1967

3,344,131
COBALT-CONTAINING REACTIVE MONOAZO DYES
Hanspeter Uehlinger, Basel, Switzerland, assignor to Sandoz Ltd., also known as Sandoz A.G., Basel, Switzerland
No Drawing. Filed Aug. 24, 1964, Ser. No. 391,799
Claims priority, application Switzerland, Oct. 14, 1960, 11,562/60
6 Claims. (Cl. 260—146)

The present application is a continuation-in-part of my application Ser. No. 141,597, filed Sept. 29, 1961 (now abandoned).

This invention relates to the red-brown 1:2-cobalt complex compounds of the reactive monoazo dyes of the formula

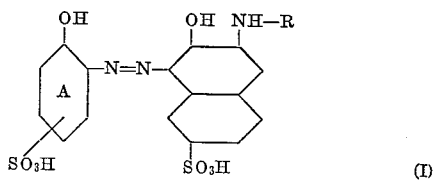

wherein R represents the radical of a compound which contains at least one substituent capable of forming a chemical linkage with the substrate, and wherein the nucleus A may be further substituted, e.g. by a halogen atom (chlorine, bromine), a nitro group, a lower alkyl or lower alkoxy group (methyl, ethyl, methoxy, ethoxy) or an acylamino group (acetylamino, propionylamino, butyrylamino). The process for the production of the new cobalt-containing reactive dyes consists in reacting, in any desired order, 1 mol of the diazo compound of an amine of the formula

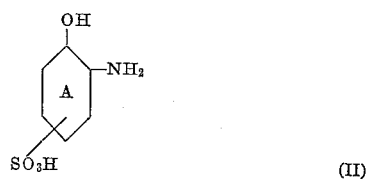

1 mol of a coupling component of the formula

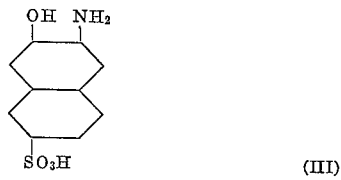

and 1 mol of a compound which is condensible with an amino group and also contains at least one substituent capable of forming a chemical linkage with the substrate, the dyes being treated with a cobalt-yielding agent either during formation or in substance.

The process admits of the following modes of operation:

(a) 1 mol of a monoazo dye which is obtained by coupling 1 mol of the diazo compound of an amine of Formula II with 1 mol of a coupling component of Formula III and subsequent metallization is reacted with 1 mole of a compound which is condensible with an amino group and contains at least one substituent capable of forming a chemical linkage with the substrate;

(b) 1 mol of a coupling component of Formula III is reacted with 1 mol of a compound which is condensible with an amino group and contains at least one substituent capable of forming a chemical linkage with the substrate, and the resulting product reacted with 1 mol of the diazo compound of an amine of the Formula II and subsequently metallized.

The reactive substituent R is preferably the radical of an acid which contains at least one mobile halogen atom or a double bond capable of addition, e.g. the radical of chloroacetic, bromoacetic, β-chloropropionic, β-bromopropionic, acrylic, methacrylic, α-chloroacrylic, α-bromoacrylic, β- or γ-chlorocrotonic or -bromocrotonic, α,β- or β,β-dichloro- or -dibromoacrylic acid, or the radical of a diazine or triazine compound containing at least two mobile halogen atoms, e.g. cyanuric chloride, cyanuric bromide, a primary condensation product of a cyanuric halide of the formula

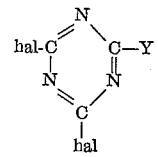

wherein hal represents chlorine or bromine and

Y the radical, which may be further substituted, of a primary or secondary aliphatic, alicyclic, aromatic or heterocyclic amine, or of an aliphatic, alicyclic, aromatic or heterocyclic hydroxy compound, or more particularly the radical of aniline, its alkyl and sulfonic acid or carboxylic acid derivatives, the radicals of low monoalkyl- and dialkylamines and of ammonia, 2,4,6-trichloropyrimidine and 2,4,6-tribromopyrimidine and their derivatives, which contain, e.g., the following substituents in the 5-position: methyl, carboxy, methoxycarbonyl, ethoxycarbonyl or substituted alkyl, e.g. carboxymethyl, chloromethyl or bromomethyl; 2,4,5,6-tetrachloro- or -tetrabromopyrimidine, 2,4,6-trichloro-5-bromopyrimidine, 2,4 - dichloro - 5 - chloromethylpyrimidine, 2,4-dichloro-5-chloromethyl-6-methylpyrimidine and the corresponding bromo-derivatives.

The coupling of the diazo compound of an amine of Formula II with a coupling component of Formula III is carried out of advantage in an alkaline medium, preferably at a temperature of 0° to 10° C. The reaction of the resulting monoazo dyes or their cobalt complex compounds with a functional derivative of an acid containing at least one mobile halogen atom or a double bond capable of addition is carried out preferably with the acid chlorides e.g. of chloroacetic acid or β-chloropropionic acid. The reaction is conducted in aqueous medium, preferably with good cooling and in the presence of an acid-binding agent such as sodium carbonate, sodium hydroxide, sodium acetate or the corresponding potassium salts.

For acylation, the carboxylic acid halide is employed as such or in solution in two to five times its amount of benzene, chlorobenzene, methylbenzene, dimethylbenzene or acetone, the solution being added dropwise to the aqueous solution of the substance containing the amino group at 0–30° C., or preferably about 2–5°, in the presence of an acid-binding agent, preferably at a pH value of 7 to 3.

The reaction of the monoazo dyes of the invention or their cobalt complex compounds with the diazine or triazine compounds containing at least two mobile halogen atoms is also carried out preferably in aqueous medium. The halide can be employed as such in concentrated form or in solution in an organic solvent. Especially suitable solvents for it are acetone, benzene, chlorobenzene and toluene.

The reaction temperature is adjusted to the reactivity of the starting products and varies from 0° to 100° C., e.g. 0° to 20° C. for cyanuric chloride and cyanuric bromide, 30° to 50° C. for the monocondensation products, which contain two mobile halogen atoms, of cyanuric chloride or bromide and ammonia, a primary or secondary amine, an alcohol or phenol, and 20° to 100° C. for the trichloro-, tribromo-, tetrachloro- and tetrabromopyrimidines. If temperatures higher than about 40° C. are necessary, it is advisable to work in a vessel fitted with a reflux condenser because of the volatility in water vapor of the halogenopyrimidines.

The reaction is carried out in weakly alkaline, neutral to weakly acid medium, but preferably within the pH range of 7 to 3. To neutralize the hydrogen halide formed, an acid-binding agent, e.g. sodium acetate, is added to the reaction solution at the start of the reaction or sodium or potassium carbonate or bicarbonate in solid pulverized form or in concentrated aqueous solution is added in small portions during the reaction. Aqueous solutions of sodium or potassium hydroxide are also suitable as neutralizing agents. The addition of small amounts of a wetting or emulsifying agent to the reaction mixture can accelerate the rate of reaction. The reaction is controlled so that only one halogen atom reacts with an exchangeable hydrogen atom of the amino group.

The dyes which bear a 4,6-dihalo-1,3,5-triazinyl-2-amino group may be further condensed with ammonia, a primary or secondary amine, an alcohol or a phenol to produce a dye carrying a monohalo-1,3,5-triazinyl-2-amino group.

The monoazo dyes are converted into their cobalt complex compounds preferably in aqueous solution or in an organic medium, for example formamide, or in the concentrated aqueous solution of an alkali metal salt of a low molecular aliphatic monocarboxylic acid. It is advantageous to allow an amount of cobalt-yielding agent containing less than two but at least one atom of cobalt to act upon two molecules of the monoazo dye.

Examples of suitable cobalt compounds are cobaltous formate, cobaltous acetate and cobaltous sulfate. When metallization is effected in the concentrated aqueous solution of an alkali metal salt of a low molecular aliphatic monocarboxylic acid, e.g. sodium acetate, water-insoluble metal compounds, for example cobalt hydroxide or cobalt carbonate, can also be used.

It is especially advantageous to metallize in aqueous or alkaline medium to which the cobalt compounds are added in presence of compounds which maintain the cobalt dissolved in complex combination in caustic alkaline medium, e.g. tartaric acid, citric acid and lactic acid.

The solutions of the cobalt complex compounds obtained may be run into brine, and the compounds are then precipitated by the addition of salt, filtered off, washed if necessary and dried.

The cobalt-containing azo dyes thus obtained are homogeneous cobalt complex compounds in which essentially one atom of cobalt is linked to two molecules of the monoazo compounds.

The new cobalt-containing reactive dyes have very low salt sensitivity and possess very good solubility in water, which means that after fixation the portion of dye not chemically linked with the fiber can be easily washed off. They are therefore suitable for dyeing leather, for dyeing, padding or printing wool, silk and synthetic polyamide fibers, and in particular fibers of natural or regenerated cellulose, in red-brown shades.

It is noteworthy that the red-brown shades obtained with the cobalt complex dyes of the invention depend on the specific coupling component which bears the amino and the hydroxy group bound to the same nucleus and both in β-positions. None of the known amino-hydroxynaphthalene coupling components which bear the amino group bound to one nucleus and the amino group bound to another nucleus, e.g. 1-amino-6- or -7-hydroxynaphthalene, 1-amino-8-hydroxynonaphthalene-3,6- and -4,6-disulfonic acid, 2-amino-5-hydroxynaphthalene-7-sulfonic acid and -1,7-disulfonic acid, 2-amino-8-hydroxynaphthalene-6-sulfonic acid and -3,6-disulfonic acid, is able to produce red-brown cobalt complex dyes. The replacement of cobalt by other metals in the formation of the metal compounds also leads to shades different from the red-brown hues of the cobalt complex dyes, e.g. dull violet for chromium and red for copper or nickel.

The dyeings and prints on cellulosic fibers may be submitted to an alkaline aftertreatment at high temperature if necessary, and soaped. They possess very good fastness to light, gas fumes, washing water, perspiration, soda boiling, dry rubbing, alkali, peroxide, chlorinated swimming pool water, vulcanizing and organic solvents such as those used for dry cleaning and are stable to resin finishing, i.e. a resin finishing treatment does not affect appreciably the light fastness of their dyeings and prints.

The prints on cellulosic fibers (cotton, linen, viscose filament yarn, viscose staple fiber) obtained with the dyes of the invention have sharp edges and perfectly white unprinted areas, whereas many other 1:2-metal complex dyes yield blurred edges and/or stain the unprinted areas.

The dyeings on wool and synthetic polyamide fibers, especially when submitted to an aftertreatment under weakly alkaline conditions, possess good fastness to light, washing, perspiration, water, milling, rubbing and dry cleaning and are stable to weak acids such as acetic and tartaric acid.

In the following exmples the parts and percentages are by weight and the temperatures in degrees centigrade.

EXAMPLE 1

23.4 parts of 2-amino-4-nitro-1-hydroxybenzene-6-sulfonic acid is stirred into 80 parts of water and 15 parts of 30% hydrochloric acid, and diazotized at 0–5° with a solution of 7 parts of sodium nitrite in 25 parts of water. Sodium bicarbonate is added so that the diazo solution reacts neutral to Congo Red indicator paper, and it is then run at 0–5° into a solution of 23.9 parts of 2-amino-3-hydroxynaphthalene-6-sulfonic acid and 10.5 parts of 30% sodium hydroxide solution in 200 parts of water. The pH of the coupling solution is maintained at 8.5–9.0 by the addition of 30% sodium hydroxide solution. After stirring for 1 hour the coupling reaction is completed. Sodium chloride is added, causing the dye to be completely precipitated, and it is filtered off, and washed with sodium chloride solution. The filter cake is suspended in 160 parts of water at 70°, and in 30 minutes a solution of 15 parts of cobalt sulfate in 40 parts of water is dropped in at 70–75°. By simultaneous addition of dilute sodium carbonate solution the pH value is maintained between 5.0 and 6.0. After the addition of the cobalt sulfate solution the solution is stirred for a further 30 minutes at 70°, then the cobalt complex compound is precipitated by the addition of sodium chloride, filtered off and washed with sodium chloride solution.

The dye paste is dissolved in 150 parts of water at 80°. 21.8 parts of 2,4,5,6-tetrachloropyrimidine are added and the solution stirred for 4 hours at 80°. During this time its pH value is maintained at 4–5 by the addition of dilute sodium carbonate solution. On completion of condensation the dye is precipitated by the addition of sodium chloride at 80° and filtered off. On drying the dye is obtained as a dark powder which gives dark brown solutions in water.

Mercerized cotton sateen is printed with a paste of the following composition:

| | Parts |
|---|---|
| Dye obtained as described above | 30 |
| Urea | 100 |
| Water | 395 |
| 3% sodium alginate thickening | 450 |
| Sodium 1-nitrobenzene-3-sulfonate | 10 |
| Sodium carbonate | 15 |
| | 1000 |

The print is dried, steamed for 10–15 minutes at 102–104°, rinsed in cold and warm water, soaped at the boil, rinsed again and dried. A reddish brown print with good light and wet fastness is obtained.

EXAMPLE 2

22.4 parts of 2-amino-6-chloro-1-hydroxybenzene-4-sulfonic acid are stirred into 80 parts of water and 15 parts of 30% hydrochloric acid, and diazotized at 0–5° with a solution of 7 parts of sodium nitrite in 25 parts of water. The diazo solution, made neutral to Congo Red indicator paper with sodium bicarbonate, is dropped at 0–5° into a solution of 23.9 parts of 2-amino-3-hydroxynaphthalene-6-sulfonic acid and 10.5 parts of 30% sodium hydroxide solution in 200 parts of water, the pH value of the coupling mass being maintained between 8.5 and 9.0 by the addition of 30% sodium hydroxide solution. After stirring for 3 hours the dye is completely precipitated by the addition of sodium chloride, filtered off and washed with sodium chloride solution.

The filter cake is suspended in 160 parts of water at 70° and complexed with cobalt as described in Example 1. The cobalt complex compound is precipitated by the addition of sodium chloride, filtered off and washed with sodium chloride solution.

The paste is dissolved in 150 parts of water at 80°. 18.3 parts of 2,4,6-trichloropyrimidine are added and the solution stirred for 4 hours at 80°, the pH value being maintained between 4 and 5 by the addition of dilute sodium carbonate solution. On completion of condensation, the dye is precipitated by the addition of sodium chloride at 80° and filtered off. On drying, it is a dark powder which dissolves in water with a dark brown coloration.

A print on cotton cretonne produced with this dye by the procedure described in Example 1 is of reddish brown shade and has good light and wet fastness.

A fabric of mercerized cotton is impregnated with a padding solution at 40° containing 30 g./l. of calcined sodium carbonate, 20 g./l. of the dye obtained as described in this example and 5 g./l. of sodium 1-nitrobenzene-3-sulfonate. The fabric is squeezed to give an increase of 80% to 100% on its original dry weight and conditioned in a chamber at constant atmospheric humidity for 4–6 hours at 90–95°. It is then rinsed well in cold and warm water, soaped at the boil for 15 minutes with 5 g./l. soap, rinsed again and dried. A reddish brown dyeing of good light and wet fastness is obtained.

EXAMPLE 3

48.4 parts of the monoazo type described in paragraph 1 of Example 1 are transformed into the 1:2-cobalt complex compound according to the details of Example 1.

The dye paste is dissolved in 300 parts of water and at 0°, 18.5 parts of cyanuric chloride are added. The pH value of the reaction solution is maintained between 3.0 and 4.0 by the dropwise addition of dilute sodium carbonate solution. After stirring for 4 hours at 0° condensation is completed.

The cobalt complex compound is subsequently heated at 45° and 17.3 parts of 3-aminobenzene-1-sulfonic acid dissolved in 10 parts of water at pH 6.0 are added. The pH value of the reaction solution is maintained between 5.0 and 6.0 by dropwise addition of a dilute sodium carbonate solution. After stirring for 1 hour at 45° condensation is completed. The dye is precipitated by the addition of sodium chloride and filtered off. On drying with vacuum it is a dark powder which dissolves in water with a red-brown coloration.

Mercerized cotton sateen is printed with a paste of the following composition:

| | Parts |
|---|---|
| Dye obtained as described above | 30 |
| Urea | 50 |
| Water | 418 |
| 3% sodium alginate thickening | 450 |
| Potassium carbonate | 20 |
| 30% sodium hydroxide solution | 2 |
| Sodium 1-nitrobenzene-3-sulfonate | 30 |
| | 1000 |

The print is dried, steamed for 10–15 minutes at 102–104°, rinsed in cold and warm water, soaped at the boil, rinsed again and dried. A reddish brown print with good light and wet fastness is obtained.

EXAMPLE 4

51.8 parts of the dye sodium-1-(2′-hydroxy-5′-chlorophenylazo)-2-hydroxy-3-aminonaphthalene-7,3′-disulfonate are transformed into the 1:2-cobalt complex compound according to the particulars of Example 1.

The dye paste is dissolved in 350 parts of water and at 0–5°, 12.5 parts of chloroacetyl chloride are added dropwise with good stirring. At the same time sodium carbonate solution is dropped in at such a rate that the pH value of the solution is maintained between 6.0 and 6.5. After all the chloroacetyl chloride has been added, stirring is continued for 1–2 hours at the same temperature. If the reaction is not yet completed a little more chloroacetyl chloride is added. As soon as no free amino group is indicated, the reaction mass is neutralized with sodium carbonate solution and the new dye salted out with sodium chloride, isolated and dried. It is a brown powder which dissolves in water with a red-brown coloration.

2 parts of the above described dyestuff, 0.8 part of an oxethylated fatty amine and 0.5 part of an oleylpolyglycol ether are dissolved in 5000 parts of water, and 2 parts of glacial acetic acid are added to the solution. This dyebath is heated to 40–50°, 100 parts of wool entered, and the bath brought to the boil in 30 minutes. It is boiled for 45 minutes and the wool then rinsed and dried. A level reddish brown dyeing of very good light and wet fastness is obtained. On completion of dyeing the dyebath may be neutralized with ammonia and the goods treated in it for 20 minutes at 90° in order to obtain somewhat better wet fastness. The same effect can be obtained by aftertreatment of the dyed goods in a fresh bath of 500 parts of water and 3 parts of hexamethylene-tetramine for 20–30 minutes at 90–95°.

The following table contains further cobalt-containing reactive dyes obtained by the procedures described in Examples 1 to 4. They are characterized in the table by the diazo component [column (I)], the compound which is condensible with an amino group and contains a substituent capable of forming a chemical linkage with the substrate (II) and the shade of the dyeing on cotton (III), the coupling component being always 2-amino-3-hydroxy-naphthalene-6-sulfonic acid.

| Example | (I) | (II) | (III) |
|---|---|---|---|
| 5 | 2-amino-1-hydroxy-6-nitrobenzene-4-sulfonic acid. | 2,4-dichloro-6-amino-1,3,5-triazine | Reddish brown. |
| 6 | ----do---- | 2,4,5,6-tetrabromopyrimidine | Do. |
| 7 | ----do---- | β-Chloropropionic acid chloride | Do. |
| 8 | 2-amino-1-hydroxy-4-chlorobenzene-6-sulfonic acid. | ----do---- | Do. |
| 9 | ----do---- | 2,4,6-trichloropyrimidine | Do. |
| 10 | 2-amino-1-hydroxy-6-chlorobenzene-4-sulfonic acid. | Cyanuric chloride | Do. |

| Example | (I) | (II) | (III) |
|---|---|---|---|
| 11 | 2-amino-1-hydroxy-6-chlorobenzene-4-sulfonic acid. | 2,4,5,6-tetrachloropyrimidine | Reddish brown. |
| 12 | ___do___ | Acrylyl chloride | Do. |
| 13 | 2-amino-1-hydroxybenzene-4-sulfonic acid. | 2,4-dichloro-5-chloromethyl-6-methylpyrimidine. | Do. |
| 14 | ___do___ | 2,4,5,6-tetrachloropyrimidine | Do. |
| 15 | ___do___ | 2,4,6-trichloro-5-bromo-pyrimidine | Do. |
| 16 | ___do___ | 2,4-dichloro-6-phenylamino-1,3,5-triazine-4'-sulfonic acid. | Do. |
| 17 | ___do___ | 2,4-dichloro-6-methylamino-1,3,5-triazine. | Do. |
| 18 | 2-amino-1-hydroxy-6-acetylaminobenzene-4-sulfonic acid. | 2,4-dichloro-6-amino-1,3,5-triazine | Do. |
| 19 | ___do___ | 2,4,6-trichloropyrimidine | Do. |
| 20 | 2-amino-1-hydroxy-4-methylbenzene-6-sulfonic acid. | 2,4-dichloro-6-(2'-hydroxyethylamino) 1,3,5-triazine. | Do. |
| 21 | 2-amino-1-hydroxy-4-ethoxybenzene-6-sulfonic acid. | 2,4,5,6-tetrachloropyrimidine | Do. |
| 22 | 2-amino-1-hydroxy-6-propionylaminobenzene-4-sulfonic acid. | 2,4-dichloro-6-phenyl-amino-1,3,5-triazine-3'-sulfonic acid. | Do. |
| 23 | 2-amino-1-hydroxy-4-methoxybenzene-6-sulfonic acid. | 2,4-dichloro-6-amino-1,3,5-triazine | Do. |
| 24 | 2-amino-1-hydroxy-4-nitrobenzene-6-sulfonic acid. | 2,4-dichloro-6-carboxy-methylamino-1,3,5-triazine. | Do. |
| 25 | ___do___ | 2,4-dichloro-6-(2'-hydroxypropyl-amino)-1,3,5-triazine. | Do. |
| 26 | ___do___ | 2,4-dichloro-6-(2'-carboxy-phenyl-amino)-1,3,5-triazine. | Do. |
| 27 | ___do___ | β-Bromopropionic acid chloride | Do. |
| 28 | ___do___ | α-Chloracrylic acid chloride | Do. |
| 29 | ___do___ | 2,4-dichloro-6-(2'-sulfoethyl-amino)-1,3,5-triazine. | Do. |
| 30 | ___do___ | 2,4-dichloro-6-di-(2'-hydroxy-ethyl)-amino-1,3,5-triazine. | Do. |
| 31 | ___do___ | 2,4-dibromo-6-methyl-amino-1,3,5-triazine. | Do. |
| 32 | ___do___ | 2,4,6-tribromopyrimidine | Do. |
| 33 | ___do___ | 2,4-dichloro-6-(3'-methoxypropylamino)-1,3,5-triazine. | Do. |
| 34 | ___do___ | 2,4-dibromo-5-bromomethyl-6-methylpyrimidine. | Do. |
| 35 | ___do___ | 2,4-dichloro-5-chloro-methyl-pyrimidine. | Do. |
| 36 | 2-amino-1-hydroxy-4-chlorobenzene-6-sulfonic acid. | 2,4-dibromo-6-amino-1,3,5-triazine | Do. |
| 37 | ___do___ | 2,4-dichloro-6-(2'-carboxyethyl-amino)-1,3,5-triazine. | Do. |
| 38 | ___do___ | γ-Chlorocrotonic acid chloride | Do. |
| 39 | ___do___ | 2,4-dichloro-6-(2'-carboxyphenyl-amino)-1,3,5-triazine. | Do. |
| 40 | ___do___ | 2,4-dichloro-6-N-methyl-N-phenyl-amino-1,3,5-triazine. | Do. |
| 41 | ___do___ | 2,4-dichloro-6-N-methyl-N-2'-sulfoethylamino-1,3,5-triazine. | Do. |
| 42 | ___do___ | 2,4,6-trichloro-5-methyl-pyrimidine | Do. |
| 43 | ___do___ | 2,4,6-trichloro-5-methoxy-carbonyl-pyrimidine. | Do. |
| 44 | 2-amino-1-hydroxy-benzene-4-sulfonic acid. | 2,4,6-trichloro-5-ethoxy-carbonyl-pyrimidine. | Do. |
| 45 | ___do___ | 2,4,6-trichloro-5-carboxy-pyrimidine | Do. |
| 46 | ___do___ | 2,4-dichloro-6-(4'-carboxyphenyl-amino)-1,3,5-triazine. | Do. |
| 47 | ___do___ | 2,4-dibromo-6-phenyl-amino-1,3,5-triazine-3'-sulfonic acid. | Do. |
| 48 | ___do___ | 2,4-dichloro-6-ethyl-amino-1,3,5-triazine. | Do. |
| 49 | ___do___ | 2,4-dichloro-6-dimethyl-amino-1,3,5-triazine. | Do. |
| 50 | ___do___ | Bromoacetic acid chloride | Do. |
| 51 | ___do___ | 2,3-dichloropropionic acid chloride | Do. |
| 52 | 2-amino-1-hydroxy-4-chlorobenzene-6-sulfonic acid. | Cyanuric chloride | Do. |
| 53 | ___do___ | α-Bromoacrylic acid chloride | Do. |
| 54 | 2-amino-1-hydroxybenzene-4-sulfonic acid. | 2,4,6-tribromopyrimidine | Do. |
| 55 | ___do___ | Cyanuric bromide | Do. |
| 56 | ___do___ | 2,4-dichloro-6-(β-ethoxyethylamino)-1,3,5-triazine. | Do. |
| 57 | ___do___ | 2,4-dichloro-6-di-(β-hydroxypropyl)-amino-1,3,5-triazine. | Do. |
| 58 | ___do___ | 2,4-dichloro-6-iso-amyl-amino-1,3,5-triazine. | Do. |
| 59 | 2-amino-1-hydroxy-4-nitrobenzene-6-sulfonic acid. | 2,4,6-trichloro-5-chloromethylpyrimidine. | Do. |
| 60 | ___do___ | 2,4,6-trichloro-5-carboxymethyl-pyrimidine. | Do. |
| 61 | ___do___ | 2,4-dichloro-6-N-methyl-N-carboxy-methylamino-1,3,5-triazine. | Do. |
| 62 | ___do___ | 2,4-dichloro-6-dibutyl-amino-1,3,5-triazine. | Do. |
| 63 | 2-amino-1-hydroxy-6-chlorobenzene-4-sulfonic acid. | 2,4-dichloro-6-diethyl-amino-1,3,5-triazine. | Do. |
| 64 | 2-amino-1-hydroxy-4-acetylaminobenzene-6-sulfonic acid. | 2,4,5,6-tetrachloropyrimidine | Do. |
| 65 | ___do___ | 2,4-dichloro-6-amino-1,3,5-triazine | Do. |
| 66 | ___do___ | β-Chloropropionic acid chloride | Do. |
| 67 | 2-amino-1-hydroxy-4-nitrobenzene-6-sulfonic acid. | 2,4-dichloro-5-chloromethyl-6-methyl-pyrimidine. | Do. |
| 68 | 2-amino-1-hydroxy-4-propionyl-aminobenzene-6-sulfonic acid. | 2,4,6-trichloropyrimidine | Do. |
| 69 | 2-amino-1-hydroxy-4-butyryl-aminobenzene-6-sulfonic acid. | ___do___ | Do. |
| 70 | 2-amino-1-hydroxy-4-bromobenzene-6-sulfonic acid. | 2,4,6-trichloropyrimidine | Do. |
| 71 | 2-amino-1-hydroxy-4-ethylbenzene-6-sulfonic acid. | 2,4,6-tetrachloropyrimidine | Do. |

Formulae of representative dyes of the foregoing examples are as follows.

Example 1

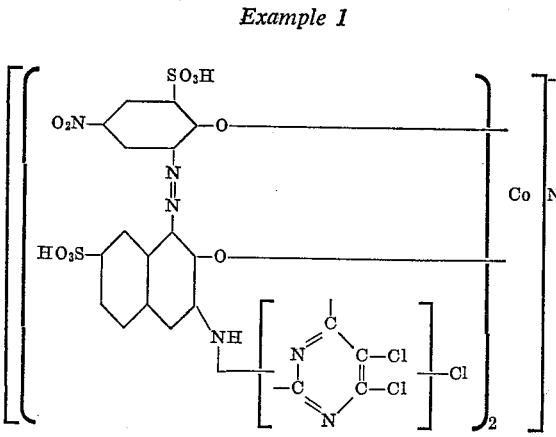

Example 2

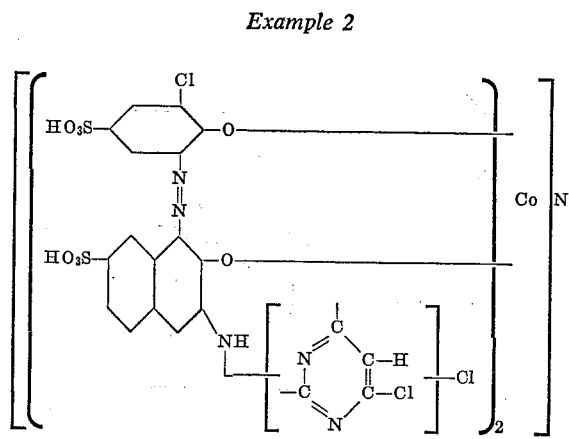

Example 3

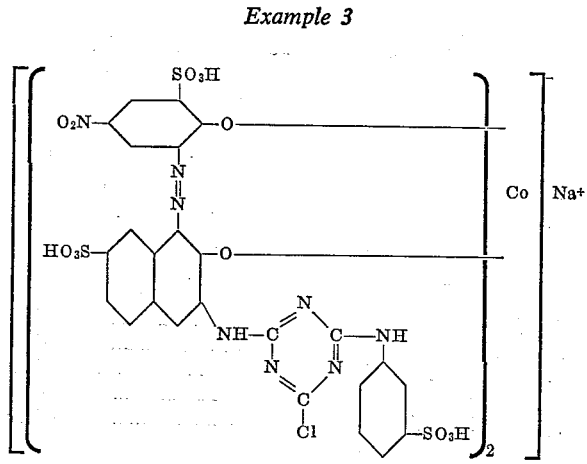

Example 4

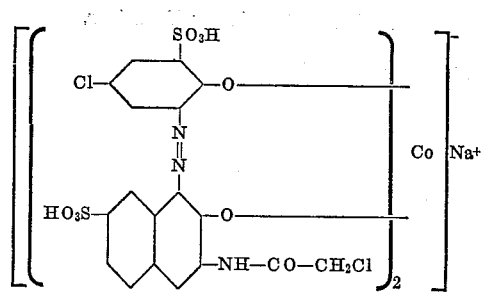

Example 14

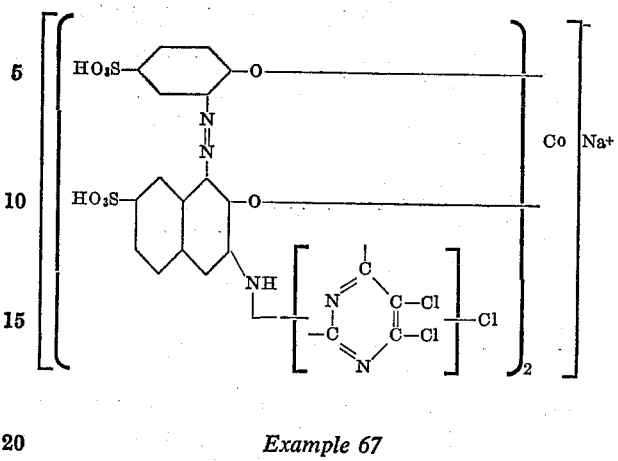

Example 67

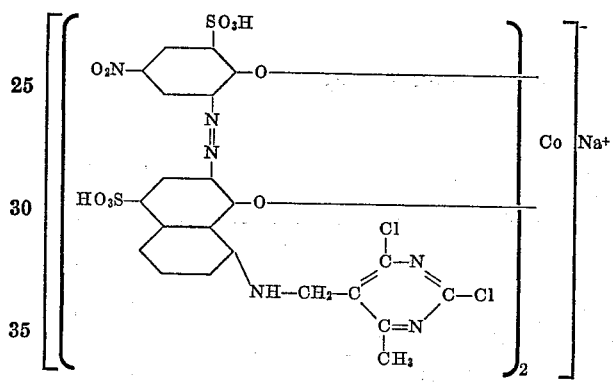

As shown by their formulae the dyes of Examples 1, 2 and 14 are mixtures with respect to their polychloropyrimidyl substituent which is 4,5,6-trichloro-pyrimidyl-2- or 2,5,6-trichloropyrimidyl-4 (Dyes 1 and 14) and 4,6-dichloro-pyrimidyl-2 or 2,6-dichloropyrimidyl-4 (Dye 2).

Having thus disclosed the invention what I claim is:

1. The 1:2-cobalt complex compound of a monoazo dye of the formula

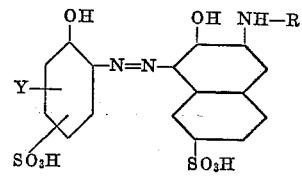

wherein

R is a member selected from the group consisting of lower mono- and dihaloalkanoyl,
lower alkenoyl,
lower halo-alkenoyl,
4,6-dihalo-1,3,5-triazinyl-2-,
4-halo-6-amino-1,3,5-triazinyl-2,
4-halo-6-lower alkylamino-1,3,5-triazinyl-2,
4-halo-6-di-(lower alkyl)-amino-1,3,5-triazinyl-2,
4-halo-6-lower hydroxyalkyl-amino-1,3,5-triazinyl-2,
4-halo-6-di-(lower hydroxyalkyl)-amino-1,3,5-triazinyl-2,
4-halo-6-lower alkoxyalkylamino-1,3,5-triazinyl-2,
4-halo-6-lower carboxyalkylamino-1,3,5-triazinyl-2,
4-halo-6-N-lower alkyl-N- lower carboxyalkylamino-1,3,5-triazinyl-2,
4-halo-6-lower sulfo-alkylamino-1,3,5-triazinyl-2, 4-halo-6-N-lower alkyl-N-lower sulfo-alkylamino-1,3,5-triazinyl-2,
4-halo-6-N-lower alkyl-N-phenylamino-1,3,5-triazinyl-2,
4-halo-6-carboxyphenylamino-1,3,5-triazinyl-2,
4-halo-6-sulfophenylamino-1,3,5-triazinyl-2,
2,4-dihalo-6-methylpyrimidyl-5-methylene,
2,4-dihalopyrimidyl-5-methylene,
dihalopyrimidyl,
trihalopyrimidyl,
5-lower alkyl-dihalopyrimidyl,
5-lower alkoxy-carbonyl-dihalopyrimidyl,
5-carboxy-dihalopyrimidyl,
5-halomethyl-dihalopyrimidyl, and
5-carboxymethyl-dihalopyrimidyl, halo being a member selected from the group consisting of chlorine and bromine, Y is a member selected from the group consisting of hydrogen, lower alkyl, lower alkoxy, chlorine, bromine, nitro and lower alkanoylamino.

2. The dye of the formula

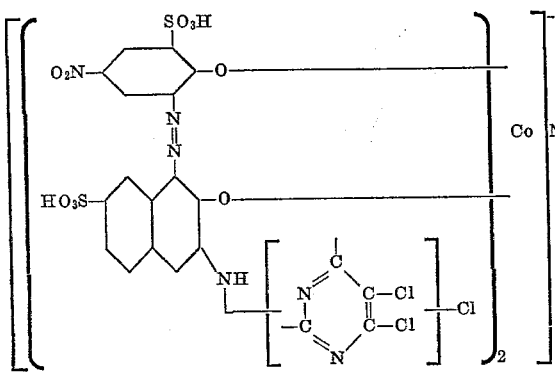

3. The dye of the formula

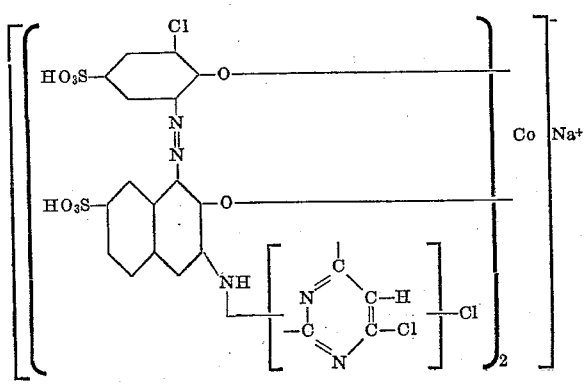

4. The dye of the formula

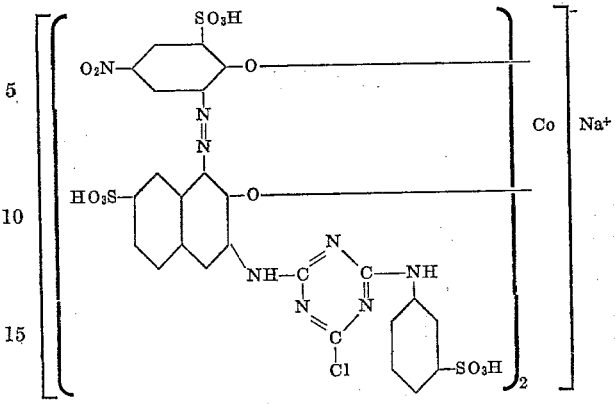

5. The dye of the formula

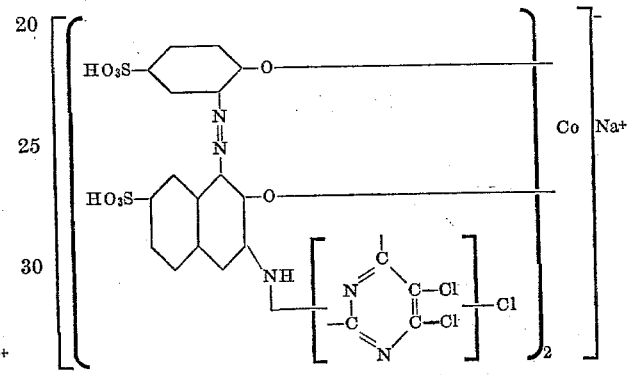

6. The dye of the formula

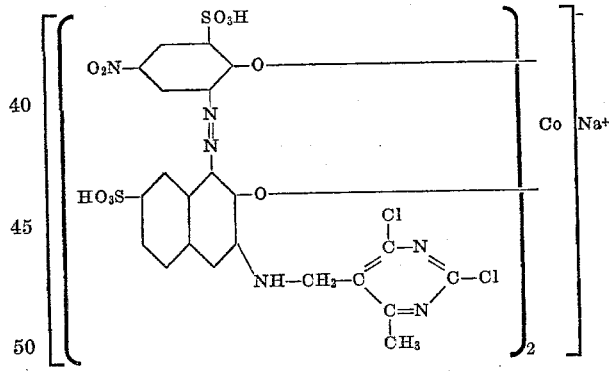

References Cited

UNITED STATES PATENTS
| | | | |
|---|---|---|---|
| 2,929,809 | 3/1960 | Menzi et al. | 260—146 |
| 2,963,472 | 12/1960 | Seitz et al. | 260—146 |
| 3,125,564 | 3/1964 | Heslop et al. | 260—153 |
| 3,127,389 | 3/1964 | Seitz et al. | 260—146 |
| 3,183,224 | 5/1965 | Benz et al. | 260—146 |

FOREIGN PATENTS
| | | |
|---|---|---|
| 623,291 | 7/1961 | Canada. |
| 1,221,621 | 6/1960 | France. |

CHARLES B. PARKER, Primary Examiner.

F. D. HIGEL, Assistant Examiner.